US007618695B2

(12) United States Patent
Snashall

(10) Patent No.: US 7,618,695 B2
(45) Date of Patent: Nov. 17, 2009

(54) CYLINDER REFURBISHING AND CYLINDER COVER

(75) Inventor: Brian Snashall, Canning Vale (AU)

(73) Assignee: Snashall Investments Pty Ltd, Bunbury (AU)

( * ) Notice: Subject to any disclaimer, the term of this patent is extended or adjusted under 35 U.S.C. 154(b) by 582 days.

(21) Appl. No.: 11/527,364

(22) Filed: Sep. 25, 2006

(65) Prior Publication Data

US 2007/0158231 A1 Jul. 12, 2007

Related U.S. Application Data

(63) Continuation of application No. PCT/AU2005/000424, filed on Mar. 23, 2005.

(30) Foreign Application Priority Data

Mar. 23, 2004 (AU) ............................ 2004901517

(51) Int. Cl.
*B29D 22/00* (2006.01)
*B29D 23/00* (2006.01)
*B32B 1/08* (2006.01)

(52) U.S. Cl. .................. 428/36.9; 428/36.91; 428/36.1; 428/36.92; 220/581; 220/694

(58) Field of Classification Search ................. 220/581, 220/694; 428/36.1, 36.9, 36.91, 36.92
See application file for complete search history.

(56) References Cited

U.S. PATENT DOCUMENTS 4,964,529 A 10/1990 Houston (Continued)

FOREIGN PATENT DOCUMENTS

CA 2000429 5/1994

(Continued)

*Primary Examiner*—Michael C Miggins
(74) *Attorney, Agent, or Firm*—Kathleen Williams; Elizabeth N. Spar; Edwards Angell Palmer & Dodge LLP

(57) ABSTRACT

A method of refurbishing a liquefied petroleum gas cylinder 13 characterised by fitting a tubular sleeve member 11 to the cylinder 13 between the footing 21 and the guard member 15. The sleeve member 11 is formed of a stretchable material which when unstretched is of height less than the surface distance along the surface of the cylinder 13 from the location of the guard 15 circumference to the location of the footing 21 circumference. The sleeve member 11 has a circumference of less than the maximum circumference of the cylinder, and has a top elastic member 27 attached at one end and a bottom elastic member 29 attached at the other end. The top elastic member 27 is in use, located proximal to the location of said guard 15 circumference and the bottom elastic member 29 is in use located proximal to the location of said footing 21 circumference. The top elastic member 27 is of a length when relaxed less than said guard circumference, and said bottom elastic member 29 is of a length when relaxed less than said footing circumference. This draws in the sleeve member 11, ensuring a smooth fit to the cylinder 13. The method provides an alternative to stripping and repainting gas cylinders when refurbishing, or at least minimizes the amount of paint required.

15 Claims, 3 Drawing Sheets

U.S. PATENT DOCUMENTS

| | | | |
|---|---|---|---|
| 5,922,158 | A | 7/1999 | Culp et al. |
| 6,057,012 | A | 5/2000 | Culp et al. |
| 2004/0256398 | A1 | 12/2004 | Alfoldi et al. |

FOREIGN PATENT DOCUMENTS

| | | |
|---|---|---|
| EP | 1489349 | 12/2004 |
| EP | 1489350 | 12/2004 |
| GB | 2317601 | 4/1998 |
| JP | 2005009679 | 1/2005 |

SKIN FITTED TO CYLINDER

SKIN LAID FLAT

CYLINDER REFURBISHING AND CYLINDER COVER

RELATED APPLICATIONS

This application is a continuation application which claims priority to PCT application Serial No.: PCT/AU2005/000424, filed Mar. 23, 2005, which claims priority to Australian Application Serial No. 2004901517 filed Mar. 23, 2004, the entireties of which are incorporated herein by reference.

FIELD OF THE INVENTION

This invention relates to a method of refurbishing cylinders for use in a gas cylinder exchange program, and a cover for use in refurbishing cylinders.

BACKGROUND ART

Cylinders are commonly used for storage and supply of liquefied petroleum gas (LPG), where the LPG is stored under pressure and in a liquid form. The gas cylinders are used by, in particular, owners of gas-fired barbeques, gas-fired patio heaters, and gas heated spa pools, in situations where there is no connection to a reticulated gas main. Where there is no gas main available, gas cylinders are the only means of supplying LPG for ordinary household applications such as cooking and heating, and indeed for business and commercial use for these purposes.

Cylinders typically have a body of cylindrical configuration tending to a rounded/dome shaped base and top portion, formed integrally therewith. The cylinder has a footing at the base thereof, formed integrally therewith, usually welded to the base. The footprint of the footing is less than the diameter of the cylinder, but sufficiently wide to provide stability. The footing is often a ring-like member attached coaxially with the cylinder at typically three or four points spaced equidistant around the base. The cylinder is provided with a guard attached coaxially with the cylinder to the top portion, the guard being usually a ring-like configuration, attached to the top of the cylinder. The guard provides protection against breakage or other damage to fittings through which gas is drawn off, in addition to providing a handle in the form of a hand-hold aperture by which the cylinder may be picked up and carried. The guard and footing are typically attached in a manner that prescribes a circle at each end of the cylinder, the circles having a circumference less than the maximum circumference of the body. In this specification the prescribed circle that the guard forms where attached to the top portion of the cylinder shall be referred to as the guard circumference, and the prescribed circle that the footing forms where attached to the base of the cylinder shall be referred to as the footing circumference.

Gas cylinders are certified for a period of ten years, after which it is necessary that they undergo a full inspection and refurbishing, and if passed are certified for a further ten year period.

In the case of smaller cylinders, commonly referred to as 4.5 kg and 9 kg cylinders, when the cylinder is empty or nearly empty, it is a common practice for the owners to take the cylinder to a depot or fuel outlet such as a petrol station, and refill the cylinder. The onus is on the depot or outlet to ensure that an out-of-test cylinder is not refilled.

More recently cylinder exchange services have become popular, where when a gas cylinder is empty or near empty, for a fee the consumer simply swaps the cylinder for a full cylinder, at the retail outlet. With cylinder exchange services, the onus does not rest with the consumer to maintain the certification of the cylinder, but rather rests with the service provider. As the exchanged cylinders have often been knocked around and/or left outside in the elements, on receipt of the empty cylinders, the service provider is required to refurbish the cylinders before they are refilled with LPG. This involves stripping of paint on the cylinder and removal of any surface rust, before the cylinder is repainted, relabelled and clad with a expanded-mesh plastic netting to prevent the paint being chipped by adjacent cylinders coming into contact with each other. Any cylinders that are out-of-date must first be recertified, which involves an internal inspection to ensure that there is no corrosion present and pressure testing. Subsequent to refurbishing, the cylinders can be refilled with LPG.

As can be appreciated, there is a high cost associated with the above described process. It is labour intensive and requires a lot of material, especially in terms of consumables such as paint and thinners, and supplies for stripping the old paint. The use of volatile organic compounds particularly in the form of thinners used in the spray painting process is of some concern, not only from the point of view of risk of fire and other accidents involving personnel, but also pollution of air from evaporation and ground water from spillage.

In view of the foregoing, it would be desirable to provide an alternative that could cut down on the amount of paint required in the refurbishing of cylinders.

Throughout the specification, unless the context requires otherwise, the word “comprise” or variations such as “comprises” or “comprising”, will be understood to imply the inclusion of a stated integer or group of integers but not the exclusion of any other integer or group of integers.

DISCLOSURE OF THE INVENTION

In accordance with one aspect of the present invention there is provided a method of refurbishing a cylinder comprising fitting a tubular sleeve member to the main body of the cylinder; said cylinder having a footing and a guard, said sleeve member being characterised by being formed of a material being stretchable in at least two dimensions and when unstretched being of height less than the surface distance along the surface of the cylinder from the location of the guard circumference to the location of the footing circumference, and a circumference of less than the maximum circumference of the cylinder, said sleeve member having a top elastic member attached at one end and a bottom elastic member attached at the other end, said top elastic member being in use located proximal to the location of said guard circumference and said bottom elastic member being in use located proximal to the location of said footing circumference, said top elastic member having a length when relaxed less than said guard circumference, and said bottom elastic member having a length when relaxed less than said footing circumference.

Preferably said material is a woven material.

Preferably said material is opaque so as to obscure the cylinder underlying surface.

With the above described arrangement, less paint is required in refurbishing a cylinder. Only sufficient paint is required to prevent corrosion of the main body of the cylinder (which is to be covered by the sleeve member), rather than the larger amount hitherto required to provide an acceptable finish. The only parts of the cylinder that need the same amount of paint as before are the top portion including the guard, and the base including the footing. The painting of the cylinders as described here is merely preferred, as in some markets where aesthetics are not considered to be important, there may be no desire to paint cylinders. However in these markets, the invention may have some application as the sleeve member can carry branding, advertising, and other information such as dangerous goods information, and weights and measures information.

Preferably the method includes the step of preparing the cylinder as described in the preceding paragraph, and allowing the paint to dry, prior to fitting the sleeve member as described.

Also in accordance with the present invention there is provided a tubular sleeve member for the main body of a cylinder of predetermined dimensions, the cylinder having a footing and a guard located at opposed ends, said sleeve member being characterised by being formed of a material being stretchable in at least two dimensions and when unstretched being of height less than the surface distance along the surface of the cylinder from the location of the guard circumference to the location of the footing circumference, and a circumference of less than the maximum circumference of the cylinder, said sleeve member having a top elastic member attached at one end and a bottom elastic member attached at the other end, said top elastic member being in use locatable proximal to the location of said guard circumference and said bottom elastic member being in use locatable proximal to the location of said footing circumference, said top elastic member having a length when relaxed less than said guard circumference, and said bottom elastic member having a length when relaxed less than said footing circumference.

Preferably said material is a woven material.

Preferably said material is opaque so as to obscure the cylinder underlying surface.

Preferably the relaxed circumference of the sleeve member lies from 50% to 85% of the maximum circumference of the cylinder.

Preferably the relaxed circumference of the sleeve member lies from 50% to 80% of the maximum circumference of the cylinder.

Preferably the relaxed circumference of the sleeve member lies from 60% to 80% of the maximum circumference of the cylinder.

Preferably the relaxed circumference of the sleeve member lies from 55% to 70% of the maximum circumference of the cylinder.

Preferably the relaxed circumference of the sleeve member lies from 60% to 64% of the maximum circumference of the cylinder.

Preferably the relaxed height of the sleeve lies from 80% to 100% of the surface distance along the surface of the cylinder from the location of the guard circumference to the location of the footing circumference.

Preferably the relaxed height of the sleeve lies from 85% to 100% of the surface distance along the surface of the cylinder from the location of the guard circumference to the location of the footing circumference.

Preferably the relaxed height of the sleeve lies from 90% to 99% of the surface distance along the surface of the cylinder from the location of the guard circumference to the location of the footing circumference.

Preferably the relaxed height of the sleeve is about 95% of the surface distance along the surface of the cylinder from the location of the guard circumference to the location of the footing circumference.

Preferably the top and bottom elastic members are stretchable from their relaxed lengths by an amount of from 60% to 90%.

Preferably the top and bottom elastic members are stretchable from their relaxed lengths by an amount of from 70% to 80%.

Preferably the top and bottom elastic members are stretchable from their relaxed lengths by an amount of about 75%.

Preferably the relaxed length of the top elastic member is from 70% to 95% of the guard circumference, and the top elastic member is stretchable to extend around the maximum circumference of the cylinder.

Preferably the relaxed length of the top elastic member is from 75% to 90% of the guard circumference.

Preferably the relaxed length of the top elastic member is from 80% to 88% of the guard circumference.

Preferably the relaxed length of the bottom elastic member is from 70% to 95% of the footing circumference, and the bottom elastic member is stretchable to extend around the maximum circumference of the cylinder.

Preferably the relaxed length of the bottom elastic member is from 75% to 90% of the guard circumference.

Preferably the relaxed length of the bottom elastic member is from 84% to 88% of the guard circumference.

With the most preferred of these dimensions, dependent also on the type of elastic utilised in the elastic members, a sleeve member is provided that is a smooth snug fit, from or near the location of said guard circumference to or near the location of said footing circumference.

The colour of the sleeve member can be chosen to accord with the trading get-up of the retail outlet for the filled cylinders, and indeed the trade mark of the retail outlet may be printed on (such as by screen printing) or woven into the material of the sleeve members. In addition to this, any markings required by regulatory bodies may be printed on or woven into the material of the sleeve members, obviating the need to separately apply stickers.

Also in accordance with the invention there is provided a cylinder including a tubular sleeve member as described above.

Also in accordance with the invention there is provided a cylinder refurbished according to the method as described above.

It is expected that the invention will provide considerable savings in labour costs associated with refurbishing used gas cylinders, in addition to savings in material costs, and also provide environmental benefits through lowered use of volatile organic compounds used as thinners and solvents in paint compositions, through lower use of paints as hitherto used in cylinder refurbishing.

BRIEF DESCRIPTION OF THE DRAWINGS

A preferred embodiment of the invention will now be described in the following description made with reference to the drawings in which.

BEST MODE(S) FOR CARRYING OUT THE INVENTION

Figure 1:
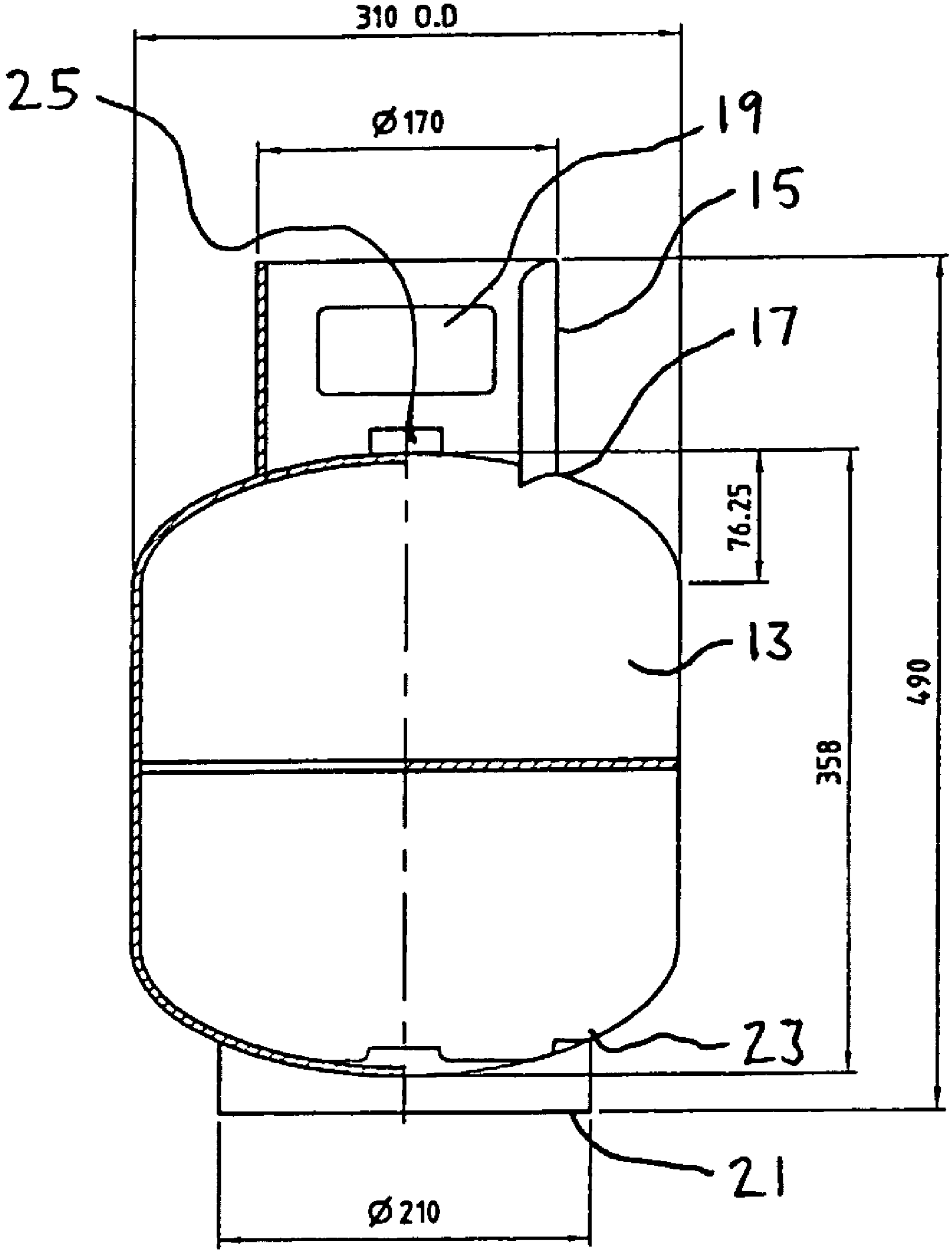
FIG. 1 is a partly cut-away view of a liquefied petroleum gas cylinder utilised with the invention.

The embodiment is a sleeve member 11 for use as a cover over a liquefied petroleum gas cylinder 13 for use in a gas cylinder refilling exchange program. The gas cylinder 13 has a guard member 15 attached at one end of the cylinder, near the top of the cylinder 13 at a region defined as the guard circumference. The guard member 15 almost completely encircles the top of the cylinder 13, and includes a cut away portion 19 which serves as a passage, providing a hand-hold through which the fingers of the hand may be passed in order to grip and lift the gas cylinder.

The gas cylinder 13 also includes a footing 21 attached at the other end of the cylinder (opposite end to that where the guard member 15 is attached) which extends entirely around the bottom of the cylinder 13, and is attached at a region defined as the footing circumference 23 of the cylinder. A fitting 25 is located at the very top of the cylinder, within the region of protection afforded by the guard 15. The fitting 25 allows for valves to be screwed into, in sealing manner, to the fitting 25 for attaching hoses etc to draw off gas contained under pressure within the cylinder 13. The guard member 15 is provided to provide physical protection against inadvertent damage to the gas fittings which are located at the top of the cylinder, usually along the cylinder central axis. The cylinder central axis is disposed vertically when the cylinder is in use.

Figure 2:
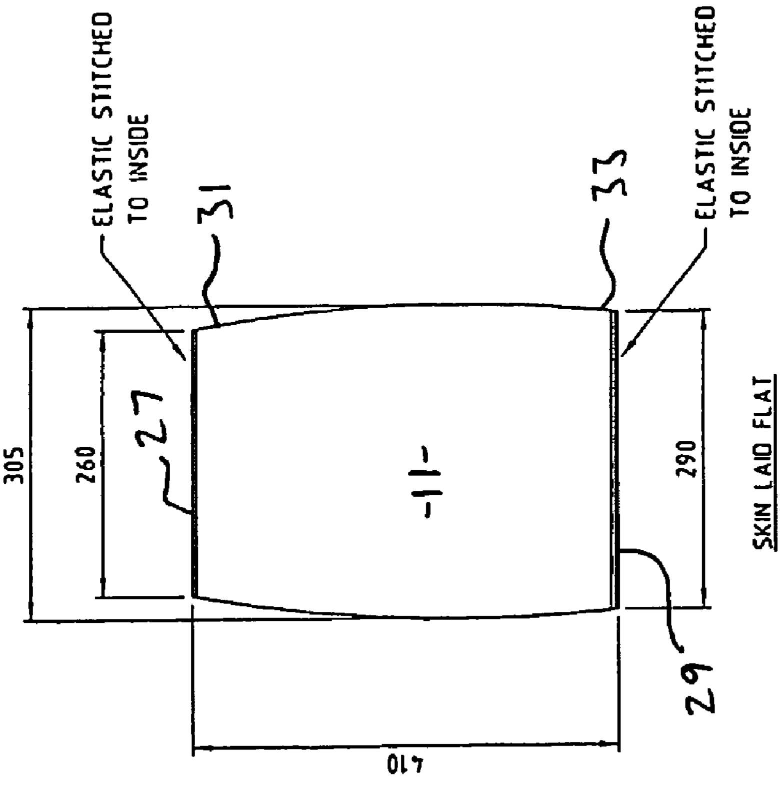
FIG. 2 is a view of the sleeve member according to the invention, for the gas cylinder shown in FIG. 1, laid flat.

The cylinder has dimensions as shown in FIG. 1, and for reference, the guard circumference is 620 mm, the footing circumference is 660 mm, while the circumference of the main body of the cylinder 13 is 1000 mm. The surface distance along the surface of the cylinder from the location of the guard circumference 17 to the locating of the footing circumference 23 is 440 mm. The sleeve 11 shown lying flat in FIG. 2, is formed from a woven stretchable fabric, stretchable in at least two dimensions. The woven stretchable fabric is woven in a continuous tube, and in this particular embodiment is Lycra™. The tube of woven material has a relaxed lateral dimension of 305 mm, when lying flat, and is cut into lengths of 410 mm. Elastic sold under the trade description of Raytex, and having a relaxed length of 520 mm is sewn to the inside of the length of tube around the circumference at the end to be the top end of the cover, while elastic having a relaxed length of 580 mm is sewn to the other end (the end to be the bottom end of the cover) of the tube of material, stitched to the inside thereof around the circumference of the tube. The length of elastic being shorter than the width of the tube of material causes the completed sleeve 11 to be drawn in at both the top 31 and the bottom 33.

Figure 3:
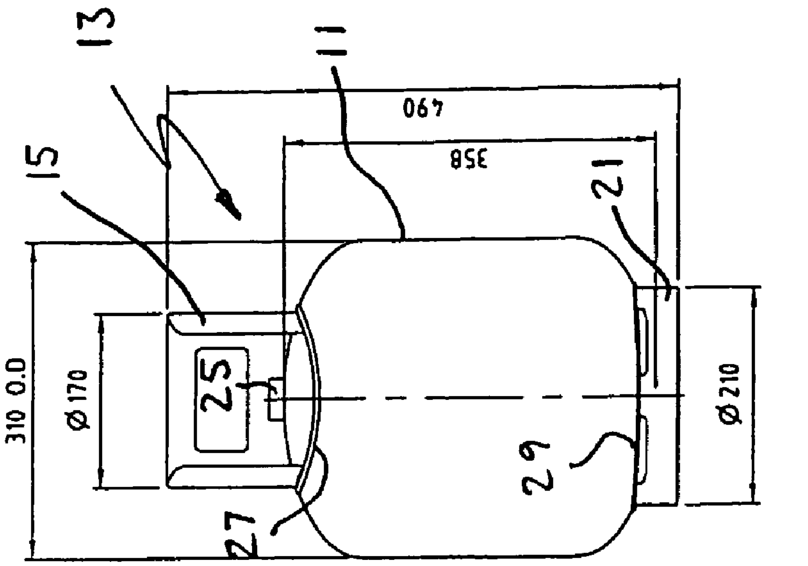
FIG. 3 is a view of a liquefied petroleum gas cylinder with the sleeve member of FIG. 2 fitted.

Referring to FIG. 3, the completed sleeve 11 is shown fitted to the cylinder 13, with the top elastic 27 fitting snugly in the location of the guide circumference, and the bottom elastic 29 fitting snugly in the location of the footing circumference. The elastic draws the tubular material comprising the sleeve in at its ends, ensuring a close and smooth fit with minimal wrinkling of the material against the cylinder at these regions.

The sleeve material may be any woven or knitted fabric that is stretchable in two dimensions. Any knit fabric such as jersey, tricot, or velour may be utilised as an alternative to lycra. The elastic may be a flat elastic strip can be capable of being stretched longitudinally by from 5% to 110%. The width of the elastic may be from 3 mm to 50 mm. The elastic may alternatively be a woven elastic braid incorporating any other stretchable fabric. In the case of a woven elastic braid, it may be possible to have a width greater than 50 mm.

Figure 4:
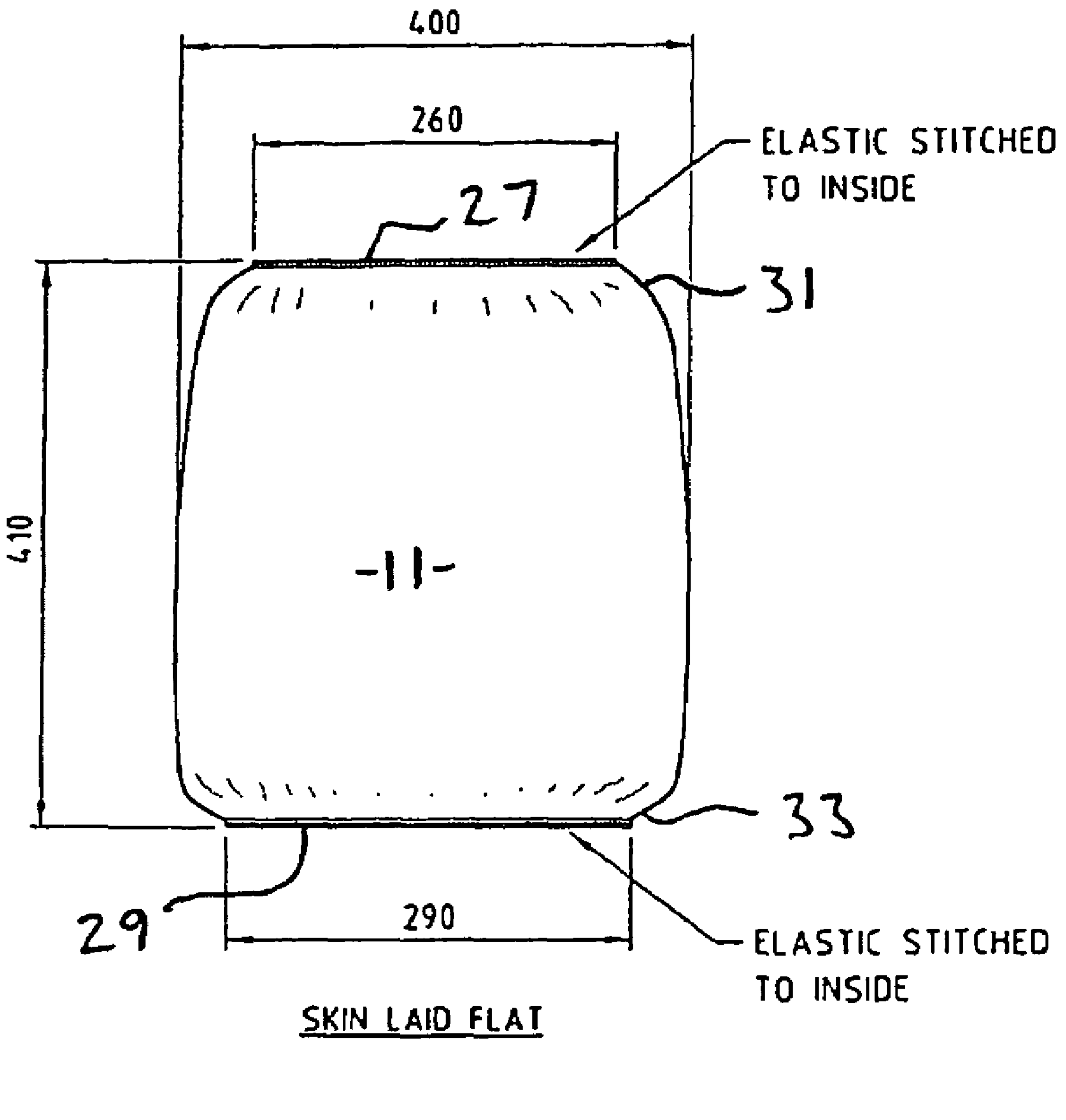
FIG. 4 is a view of a further sleeve member according to the invention, for the gas cylinder shown in FIG. 1, laid flat.

In FIG. 4, an alternative sleeve 11 is shown lying flat. This sleeve 11 is formed from a woven stretchable fabric known as cotton elastane, which is a cotton synthetic blend, and is stretchable in two dimensions. The cotton elastane is woven in a continuous tube, as in the first embodiment. While a tube may be formed from a flat sheet stitched axially, for aesthetic reasons a continuous tube is preferred. The cotton elastane tube has a relaxed lateral dimension of 400 mm, when lying flat, and is cut into lengths of 410 mm. Elastic sold under the trade description of Raytex, and having a relaxed length of 520 mm is sewn to the inside of the length of tube at the end to be the top end of the cover, while elastic having a relaxed length of 580 mm is sewn to the other end (the end to be the bottom end of the cover) of the tube of material, stitched to the inside thereto. The length of elastic being shorter than the width of the tube of material causes the completed sleeve 11 to be drawn in at both the top 31 and the bottom 33.

The sleeve of the invention is expected to solve many current servicing and refurbishment issues in the gas cylinder industry. Use of the sleeve of the invention is expected to require less maintenance when refurbishing each cylinder. The maintenance costs involved in the refurbishment including labour are expected to be reduced. Use of the sleeve of the invention is expected to be less labour intensive and should reduce the physically demanding work that is currently undertaken in performing conventional paint spraying refurbishment. Therefore the costs involved in refurbishment are expected to be reduced, possibly resulting in a lower price for consumers.

Utilising the sleeve of the invention is expected to reduce the quantity of paint required in the refurbishment of the cylinders and subsequently reduce the amount of volatile organic compounds being used (i.e. thinners), reduce the likelihood and danger of fire, lower the number of employee accidents involving dangerous chemicals, and reduce the amount of pollution being released into the atmosphere.

Finally use of the sleeve of the invention is expected to reduce the number of parts that would have to be shipped in and delivered and would therefore reduce the transport issues currently involved.

In total, it is expected that the use of the invention will dramatically reduce the impact on the environment through reduced reliance on the traditional method of refurbishing gas cylinders.

It should be appreciated that the scope of the invention is not limited to the dimensions provided in the specific embodiment described herein, and that changes may be made, largely determined by relative elasticity of materials used in making the sleeve. The invention may be used on all cylinder sizes having the same basic configuration as outlined in this specification. Such cylinders come in capacities of 4 kg, 12 kg, 15 kg, 18 kg, 45 kg, 190 kg, and 210 kg in Australia, although other capacities in other jurisdictions are likely.

The invention claimed is:

1. A method of refurbishing a cylinder said method being characterised by fitting a tubular sleeve member to the main body of the cylinder; said cylinder having a footing and a guard, said sleeve member being characterised by being formed of a material being stretchable in at least two dimensions and when unstretched being of height less than the surface distance along the surface of the cylinder from the location of the guard circumference to the location of the footing circumference, and a circumference of less than the maximum circumference of the cylinder, said sleeve member having a top elastic member attached at one end and a bottom elastic member attached at the other end, said top elastic member being in use located proximal to the location of said guard circumference and said bottom elastic member being in use located proximal to the location of said footing circumference, said top elastic member having a length when relaxed less than said guard circumference, and said bottom elastic member having a length when relaxed less than said footing circumference.

2. A method of refurbishing a cylinder as claimed in claim 1 wherein said material is a woven material.

3. A method of refurbishing a cylinder as claimed in claim 1 wherein said material is opaque so as to obscure the cylinder underlying surface.

4. A method of refurbishing a cylinder as claimed in claim 1 wherein the top portion including the guard, and the base including the footing are painted before fitting said sleeve.

5. A method of refurbishing a cylinder as claimed in claim 1 wherein sufficient paint required to prevent corrosion of the main body of the cylinder is applied thereto prior to fitting said sleeve member, as opposed to a larger amount required to provide an acceptable finish.

6. A tubular sleeve member for the main body of a cylinder of predetermined dimensions, the cylinder having a footing and a guard located at opposed ends, said sleeve member being characterised by being formed of a material being stretchable in at least two dimensions and when unstretched being of height less than the surface distance along the surface of the cylinder from the location of the guard circumference to the location of the footing circumference, and a circumference of less than the maximum circumference of the cylinder, said sleeve member having a top elastic member attached at one end and a bottom elastic member attached at the other end, said top elastic member being in use locatable proximal to the location of said guard circumference and said bottom elastic member being in use locatable proximal to the location of said footing circumference, said top elastic member having a length when relaxed less than said guard circumference, and said bottom elastic member having a length when relaxed less than said footing circumference.

7. A tubular sleeve member as claimed in claim 6 wherein said material is a woven material.

8. A tubular sleeve member as claimed in claim 6 wherein said material is opaque so as to obscure the cylinder underlying surface.

9. A tubular sleeve member as claimed in claim 6 wherein the relaxed circumference of the sleeve member lies from 50% to 85% of the maximum circumference of the cylinder.

10. A tubular sleeve member as claimed in claim 6 wherein the relaxed circumference of the sleeve member lies from 60% to 64% of the maximum circumference of the cylinder.

11. A tubular sleeve member as claimed in claim 6 wherein the relaxed height of the sleeve lies from 80% to 100% of the surface distance along the surface of the cylinder from the location of the guard circumference to the location of the footing circumference.

12. A tubular sleeve member as claimed in claim 6 wherein the relaxed height of the sleeve is about 95% of the surface distance along the surface of the cylinder from the location of the guard circumference to the location of the footing circumference.

13. A tubular sleeve member as claimed in claim 6 wherein the top and bottom elastic members are stretchable from their relaxed lengths by an amount of from 60% to 90%.

14. A tubular sleeve member as claimed in claim 6 wherein the top and bottom elastic members are stretchable from their relaxed lengths by an amount of about 75%.

15. A tubular sleeve member as claimed in claim 6 wherein the relaxed length of the top elastic member is from 70% to 95% of the guard circumference, and the top elastic member is stretchable to extend around the maximum circumference of the cylinder.

* * * * *